US012547388B1

United States Patent
Durakovic et al.

(10) Patent No.: US 12,547,388 B1
(45) Date of Patent: Feb. 10, 2026

(54) METHOD AND SYSTEM FOR COMPILER GENERATED EXTERNAL STRATEGIES

(71) Applicant: Marvell Asia Pte Ltd, Singapore (SG)

(72) Inventors: Senad Durakovic, Palo Alto, CA (US); Chien-Chun Chou, Morgan Hill, CA (US); Pranav Jonnalagadda, San Jose, CA (US); Ulf Hanebutte, Gig Harbor, WA (US); Mohana Tandyala, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/117,300

(22) Filed: Mar. 3, 2023

Related U.S. Application Data (60) Provisional application No. 63/316,438, filed on Mar. 4, 2022.

(51) Int. Cl.
*G06F 8/41* (2018.01)
*G06F 11/34* (2006.01)
*G06N 3/02* (2006.01)
*G06N 20/00* (2019.01)

(52) U.S. Cl.
CPC .......... *G06F 8/443* (2013.01); *G06F 11/3409* (2013.01); *G06N 3/02* (2013.01); *G06N 20/00* (2019.01)

(58) Field of Classification Search
CPC ........... G06F 8/41; G06F 8/44; G06F 8/40–49
USPC ................................. 717/140–161
See application file for complete search history.

(56) References Cited

U.S. PATENT DOCUMENTS

| | | | | |
|---|---|---|---|---|
| 5,778,212 A * | 7/1998 | Dehnert | ................... | G06F 8/433 717/146 |
| 5,960,202 A * | 9/1999 | Granston | ................... | G06F 8/71 717/141 |
| 5,966,538 A * | 10/1999 | Granston | ................... | G06F 8/42 717/158 |
| 2001/0032332 A1* | 10/2001 | Ward | ................... | G06F 8/4441 717/160 |
| 2006/0236310 A1* | 10/2006 | Domeika | ................ | G06F 8/443 717/140 |
| 2007/0006157 A1* | 1/2007 | Haraguchi | ................ | G06F 8/20 717/124 |
| 2007/0055963 A1* | 3/2007 | Waddington | ............ | G06F 8/423 717/140 |

(Continued)

OTHER PUBLICATIONS

A useful list of gcc compiler options, GitHub, 2020, 3 pages, [retrieved on Jul. 2, 2024], Retrieved from the Internet: <URL:https://web.archive.org/web/20201111184626/https://gist.github.com/gberthiaume/74f0485fbba5cc3249eee458c1d0d386>.*

(Continued)

*Primary Examiner* — Geoffrey R St Leger (57) ABSTRACT

A method includes receiving a high-level function in a first high-level code; generating an external strategy associated with the high-level function, wherein the external strategy is in a second high-level code; outputting the external strategy, wherein the external strategy is modifiable; compiling the high-level function into a first set of low-level instructions to be executed on the hardware based on the external strategy if the external strategy remains unchanged; and compiling the high-level function into a second set of low-level instructions to be executed on the hardware based on a modification made to the external strategy if the external strategy has been modified.

29 Claims, 8 Drawing Sheets

(56) References Cited

U.S. PATENT DOCUMENTS

2017/0344349 A1* 11/2017 He .......................... G06F 8/443
2018/0349189 A1* 12/2018 Rossi .................... G06N 3/063

OTHER PUBLICATIONS

Make (software), Wikipedia, 2021, 14 pages, [retrieved on Jun. 3, 2025], Retrieved from the Internet: <URL:https://web.archive.org/web/20210201005049/https://en.wikipedia.org/wiki/wiki/Make_(software)>.*

* cited by examiner

```
{
"file_type": "ExtStrategy",
"layers": [
  {"id":1, "op": "CONV", "to_layer_ids": [2],
   "first_onnx_op": "Conv_14_transpose_3", "last_onnx_op": "conv2d_Relu_1",
   "strategy_applied": ["split_io", "dupl_wb", "SAMMS"],
   "external_strategy_hints": []},
  {"id":2, "op": "MAXPOOL", "to_layer_ids": [3],
   "first_onnx_op": "max_pooling2d_MaxPool_1", "last_onnx_op": "max_pooling2d_MaxPool_1",
   "strategy_applied": ["split_io"],
   "external_strategy_hints": []},
  {"id":3, "op": "CONV", "to_layer_ids": [4],
   "first_onnx_op": "Conv_15", "last_onnx_op": "conv2d_1_Relu_1",
   "strategy_applied": ["split_io", "dupl_wb", "DIRECTCONV"],
   "external_strategy_hints": []}
```

FIGURE 4A

```
{"id": 4, "op": "MAXPOOL", "to_layer_ids": [5],
"first_onnx_op": "max_pooling2d_1_MaxPool_1", "last_onnx_op": "flatten_Reshape",
"strategy_applied": ["split_io"],
"external_strategy_hints": []},
{"id": 5, "op": "FC", "to_layer_ids": [6],
"first_onnx_op": "dense_MatMul", "last_onnx_op": "dense_Relu",
"strategy_applied": ["split_wb", "SAMM2"],
"external_strategy_hints": []},
{"id": 6, "op": "FC", "to_layer_ids": [],
"first_onnx_op": "dense_1_MatMul", "last_onnx_op": "dense_1_Relu_0",
"strategy_applied": ["split_wb", "SAMM2"],
"external_strategy_hints": []}
]}
```

METHOD AND SYSTEM FOR COMPILER GENERATED EXTERNAL STRATEGIES

RELATED APPLICATION

This application is a nonprovisional application and claims the benefit and priority to a provisional application No. 63/316,438 filed on Mar. 4, 2022, which is incorporated herein by reference in its entirety.

BACKGROUND

Use and implementations of machine learning (ML) and artificial intelligence (AI) methods on electronic devices has become ubiquitous. The design of a hardware architecture of the electronic devices, whether a processor, a programmable logic, a dedicated hardware such as application specific integrated circuit (ASIC), or a dedicated ML hardware, often goes through various optimization and compilation processes.

A compilation process or a compiler generates low-level executable instructions (in binary) from one or more high-level code (e.g., associated with an ML model) and identifies hardware resources (e.g., accelerator and/or general-purpose processor) to execute the low-level executable instructions. The compilation is generally an ahead of time (AOT) compilation and may include quantization, reduction in mathematical precision, mapping of the application (e.g., a neural network) to a specific number of processing tiles of the hardware, etc. The compiler may optimize the code to reduce latency and/or increase throughput. In general, the compiler maps data, e.g., the network tensor weight, the network tensor bias constants, the network tensor input and output for each network layer, etc., to particular memories and generates the executable code associated therewith. For example, the compiler decides on which processing tile and which processing unit (e.g., POD and/or PE) of the tile of a multi-core system will be processing certain data. As another example, the compiler may decide that certain data is to be processed by a central processing unit as opposed to a processing tile within a ML hardware.

The compilation process and code optimization become more complex and challenging for accelerators with array-based inference engine with many processing tiles, many on-chip memories, many dense computing elements (e.g., POD), and many sparse/irregular computing element (e.g., PE) because the compilation and code optimization often involved generating a parallel executable with optimal data layout, reduced data movement, and reduced memory usage, etc. It is appreciated that the challenges associated with compiler optimizing code for array-based inference engine is further compounded by large and complex ML models that rapidly evolve. ML models are generally represented by graphs containing a plurality of nodes (i.e., layer) that are operated on large multi-dimensional tensors. Some compilers may support specific compile arguments to trigger specific compiler optimization that were previously developed, e.g., developed by the compiler developer and made available to the user. Unfortunately, the user lacks the ability to modify a particular layer, as desired, and is often limited to the options provided by the compiler developer. Moreover, compiler developer may provide an option to optimize an overall code without the ability to fine tune with respect to a particular layer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to generate highly optimized code for complex ML models and to enable the best suited high-level primitives to be selected in order to increase parallelization strategy, reduce latency, increase throughput, etc., for a given target platform (e.g., array-based inference engine). It is appreciated that the embodiments are described with respect to ML models and compilation with respect to ML models for illustrative purposes only. As such, the embodiments should not be construed as limited to ML models but to the contrary it is meant to encompass any high-level code, its compilation, and its optimization.

In general, a compiler is configured to go through multiple levels or stages during compilation of high-level code into low-level executable instructions on a hardware. At each level (i.e., stage), the compiler needs to make one or more decisions on compilation, e.g., how to map the data to be processed and to which memory blocks, decision on a particular processing tile to execute the executable code for a particular data, etc. It is appreciated that there may be more than one approach (i.e., strategy) to execute a particular task, e.g., convolution. The compiler then generates a low-level executable code based on the actions/decisions that were made, which can be executed by hardware, e.g., an accelerator.

In contrast to the conventional compilation, the compiler according to some embodiments, also generates a strategy output that may be rendered in a command line or saved into a file, e.g., a text file. It is appreciated that the file may be in a markup language format and it may include a set of rules governing the markup information that may be included in the file and the manner by which that information is combined with the content of the document. It is appreciated that the markup language may be an extensible markup language (XML) file, as an example, associated with a particular task. It is appreciated that the file may be in object notation format that may be an open standard file format and/or data interchange format that may use human-readable text to store and transmit data objects, e.g., attribute values, arrays, etc. It is appreciated that an example of object notation format may be a JavaScript Object Notation (JSON) file and it may be associated with a particular task. In some embodiments, the strategy output generated by the compiler includes high-level instructions for the strategy/strategies (e.g., actions/ decision to perform a particular task such as a convolution, mapping various tasks to various processing elements and using various on-chip memories, methodology to slice an image to have overlapping or nonoverlapping regions, mapping of data to memory blocks, precision, quantization, processing tile to perform a particular task/instruction, dimension reordering, copying across processing tiles, methodology to split tensors, etc.) associated with a particular task. The strategy developed by the compiler may be referred to as external strategy. The generated external strategy includes high-level codes that may be user viewable and user modifiable. In other words, the user may choose to change the strategy by modifying the generated file or changing the command in the command line. The compiler then generates low-level executable instructions (in binary) from the generated file or command line once a decision is made whether to modify the external strategy. The low-level executable instructions (in binary) may then be executed by the accelerator. In some embodiments, the compiler may have already generated low-level executable instruction (in binary) based on the external strategy and if the strategy is modified, then the compiler may regenerate the low-level executable instructions (in binary) reflecting the modification that was made to the external strategy.

In some embodiments, the process may be automated such that multiple external strategies (in some embodiments permutation of all possible external strategies or a subset thereof) are developed by the compiler. In some embodiments, the low-level instructions (in binary) may be generated for each external strategy and implemented by the accelerator such that performance and efficiencies associated with each one can be measured. One or more of the generated external strategies may be selected by the compiler or by the user. In some embodiments, the selection of the external strategy is made based on the measured performance/efficiencies or merely based on the external strategy itself without measuring their performance/efficiencies by executing the low-level instructions by the accelerator. It is appreciated that one or more of the generated external strategies may be modified by a user, if desired, and then the selection is compiled into low-level instructions to be executed by the accelerator.

It is appreciated that the external strategy may be associated with certain actions (i.e., decisions) by the compiler, e.g., precision, orientation, split across distributed blocks, quantization, processing tile to perform a certain operation, methodology to split tensors, etc. In some embodiments, the external strategy may include transformation associated with tensors such as quantization, reducing precision, dimension reordering (e.g., conversion to/from width/ height/channel (WHC) from/to channel/height/width (CHW)), splitting or copying across processing tiles, or other compile time optimizations that may result in reduced execution time of the compiled code. It is appreciated that references to tensors are provided for illustrative purposes throughout the application and should not be construed as limiting the scope of the embodiments.

In some embodiments, the external strategy developed by the compiler may be devised to reduce data movement, reduce storage, reduce duplicate computations, reduce communication by duplicating computing if beneficial, reduce data conversions, etc. In some embodiments, the generated output by the compiler enables the user to modify the external strategy, if desired. For example, modification to a particular layer of an ML model may be made. It is appreciated that each layer may be treated as an independent functional unit with its own input and output. In some embodiments, a change to one functional unit (e.g., layer) does not impact other layers whereas in other examples changes to one layer may result in an improved efficiencies and performance associated with other layers.

Although an instruction set architecture (ISA) is used as a non-limiting example of the low-level instruction format to illustrate the proposed approach in the embodiments described below, it is appreciated that the same or similar approach is equally applicable to other types of low-level instructions. It is also appreciated that an ML hardware (e.g., inference engine) is used as a non-limiting example of the hardware where the low-level instructions are executed to illustrate the proposed approach in the embodiments described below, it is appreciated that the same or similar approach is equally applicable to other types of hardware or hardware simulator to support generating one or more external strategies using a compiler. Moreover, it is appreciated that an ML-related operation or function is used as a non-limiting example of the application of the high-level code to illustrate the proposed approach in the embodiments described below, it is appreciated that the same or similar approach is equally applicable to other types of software applications, including but not limited to firmware, hardware simulation software, or register transfer level (RTL) simulation software, to support the compiler generating a metadata.

For a non-limiting example, the accelerator is array-based inference engine (i.e., ML hardware) and may include 64 processing tiles (each processing tile may further include a plurality of smaller processing elements that are described in the U.S. patent application Ser. No. 16/226,508, filed Dec. 19, 2018, now issued as the U.S. Pat. No. 11,086,633 that is incorporated herein by reference in its entirety). Each of those processing tiles is configured to receive a tensor data and an instruction (i.e., compiled SoftMax instructions, ArgMax instruction, convolution, TopK, GEMM, SUM, MUL, etc.). As such, multiple tensors may be operated on simultaneously, thereby reducing the processing time. For illustrative purposes, it is assumed that there are 64 processing tiles where each processing element is configured to process 64 elements. However, it is appreciated that any number of processing tiles may be used.

The proposed ML hardware architecture (as described in the U.S. Pat. No. 11,086,633 and as further described in FIG. 1 below) is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

Figure 1:
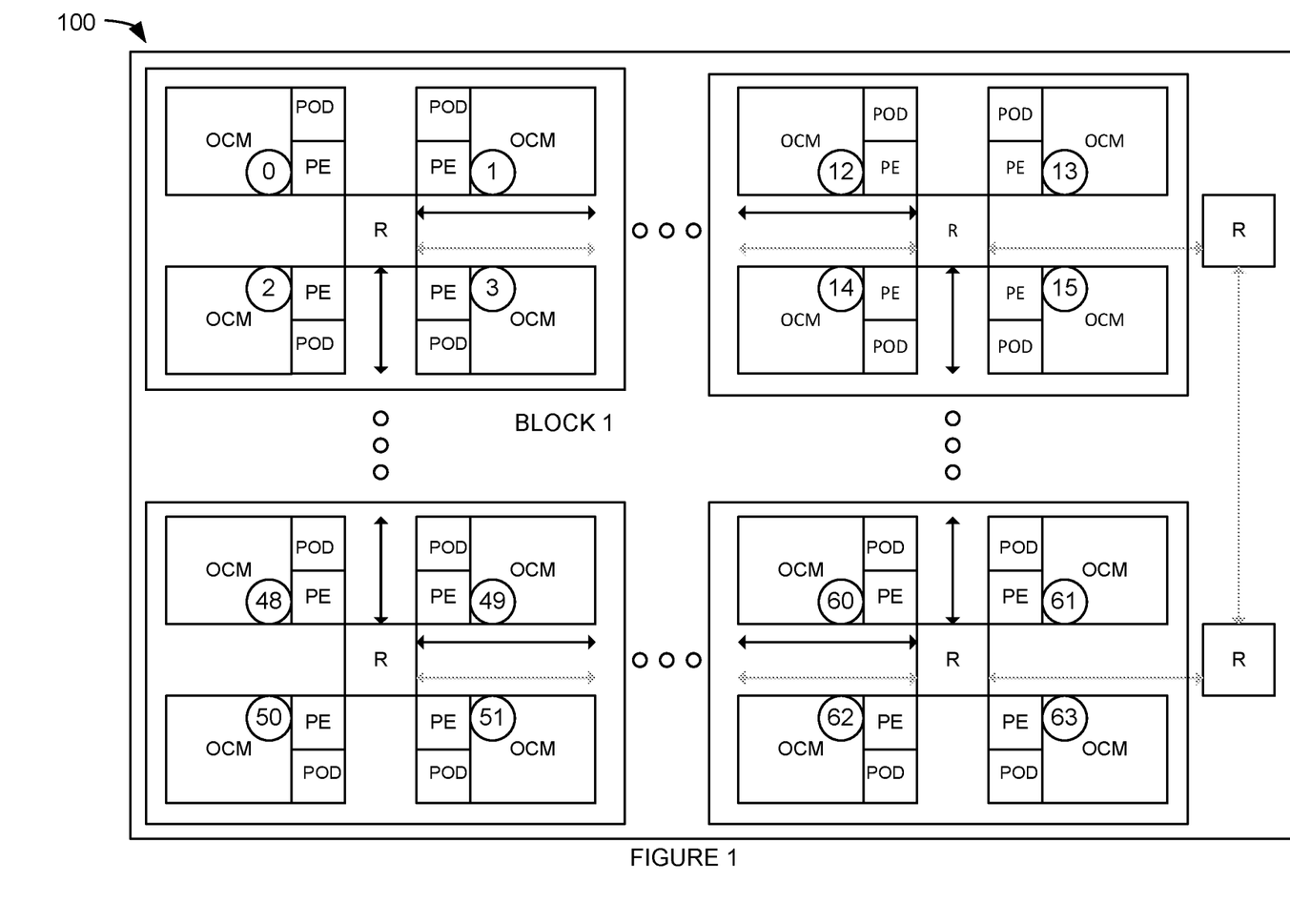
FIG. 1 depicts an example of a diagram of an ML hardware according to one aspect of the present embodiments.

In the example of FIG. 1, the ML-specific hardware 100 is a dedicated hardware, including one or more processors and/or OCM units storing the data and/or the set of low-level instructions compiled from the high-level code by the compiler to perform one or more ML operations, e.g., convolution, SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (e.g., POD) for performing a first type of ML (e.g., dense) operations, and a second type of processing unit (e.g., PE) for performing a second type of ML (e.g., sparse) operations. Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Figure 2:
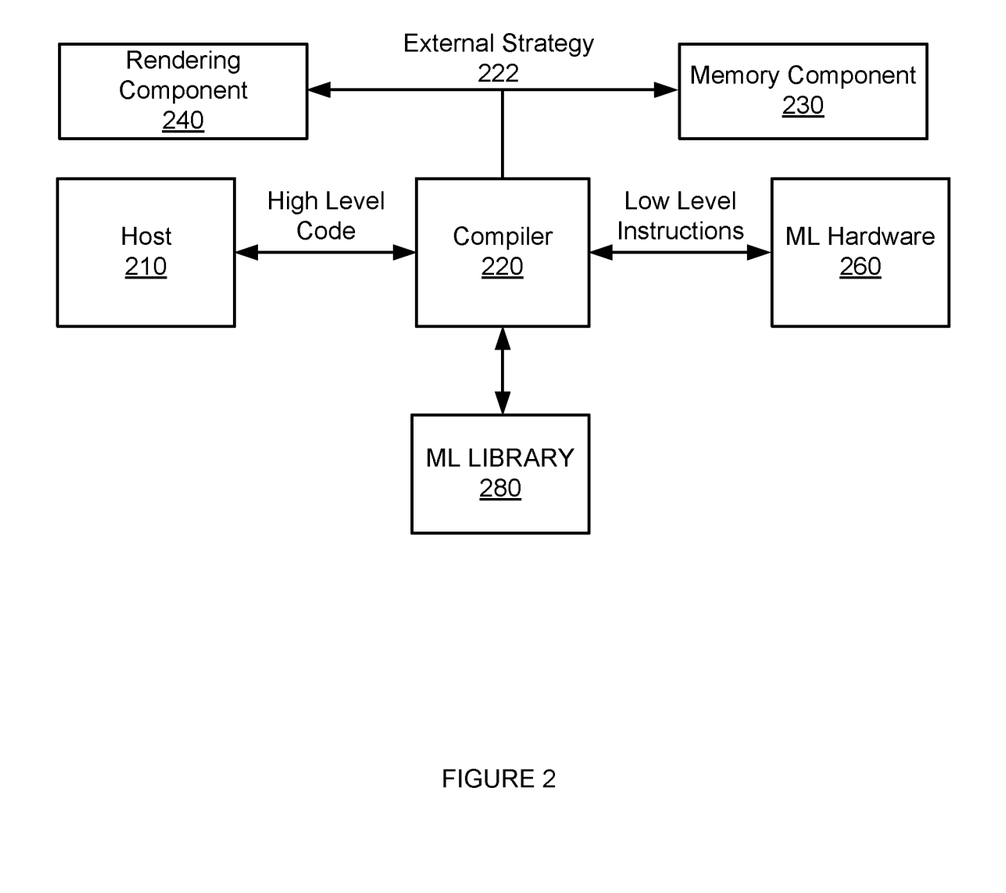
FIG. 2 depicts an example of a diagram of a system to generate an external strategy that is modifiable when the high-level code is being compiled into low-level instructions of an application for running on ML hardware according to one aspect of the present embodiments.

FIG. 2 depicts an example of a diagram of a system to support generating an external strategy that is modifiable when the high-level code is being compiled into low-level instructions of an application for running on ML hardware. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system includes a host 210, a compiler (compiling engine) 220, optionally an ML library 280, and an ML hardware 260 (similar to ML hardware 100 described in FIG. 1). It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

In the example of FIG. 2, the compiler 220 coupled to a host 210 is configured to accept a high-level code of an application (e.g., an ML operation, ML model, etc.) from the host 210, wherein the high-level code includes a plurality of high-level functions/operators each called at one or more lines in the high-level code. The compiler 220 is then configured to compile each high-level function/operator in the high-level code into a set of low-level instructions to be executed on the ML hardware 260, wherein each set of the low-level instructions is uniquely identified and associated with the high-level function. It is appreciated that the ML hardware 260 is provided for illustrative purposes and should not be construed as limiting the scope of the embodiments. For example, any type of hardware-based system configured to execute low-level instructions may be used.

Here, the high-level code is a software code written through a commonly used high-level programming language. For a non-limiting example, the high-level functions of the application or ML operation can be a dense and/or regular operation, e.g., a matrix operation such as multiplication, matrix manipulation, tanh, sigmoid, etc. For another non-limiting example, the high-level functions of the application or ML operation can be a sparse or irregular operation, e.g., memory transpose, addition operation, operations on irregular data structures (such as trees, graphs, and priority queues), etc. In some embodiments, the high-level code of the application may include one or more library function calls to an ML library 280. For a non-limiting example, the compiler 220 may call a library function to perform a matrix-matrix-multiplication of two matrices of given sizes and the ML library 280 returns the set of low-level instructions that are needed to perform this library function, or to perform a convolutional operation, wherein the set of low-level instructions includes one or more of loading data from a memory (e.g., OCM) into registers, executing dot-product, and storing the data back into the memory.

Figure 3:
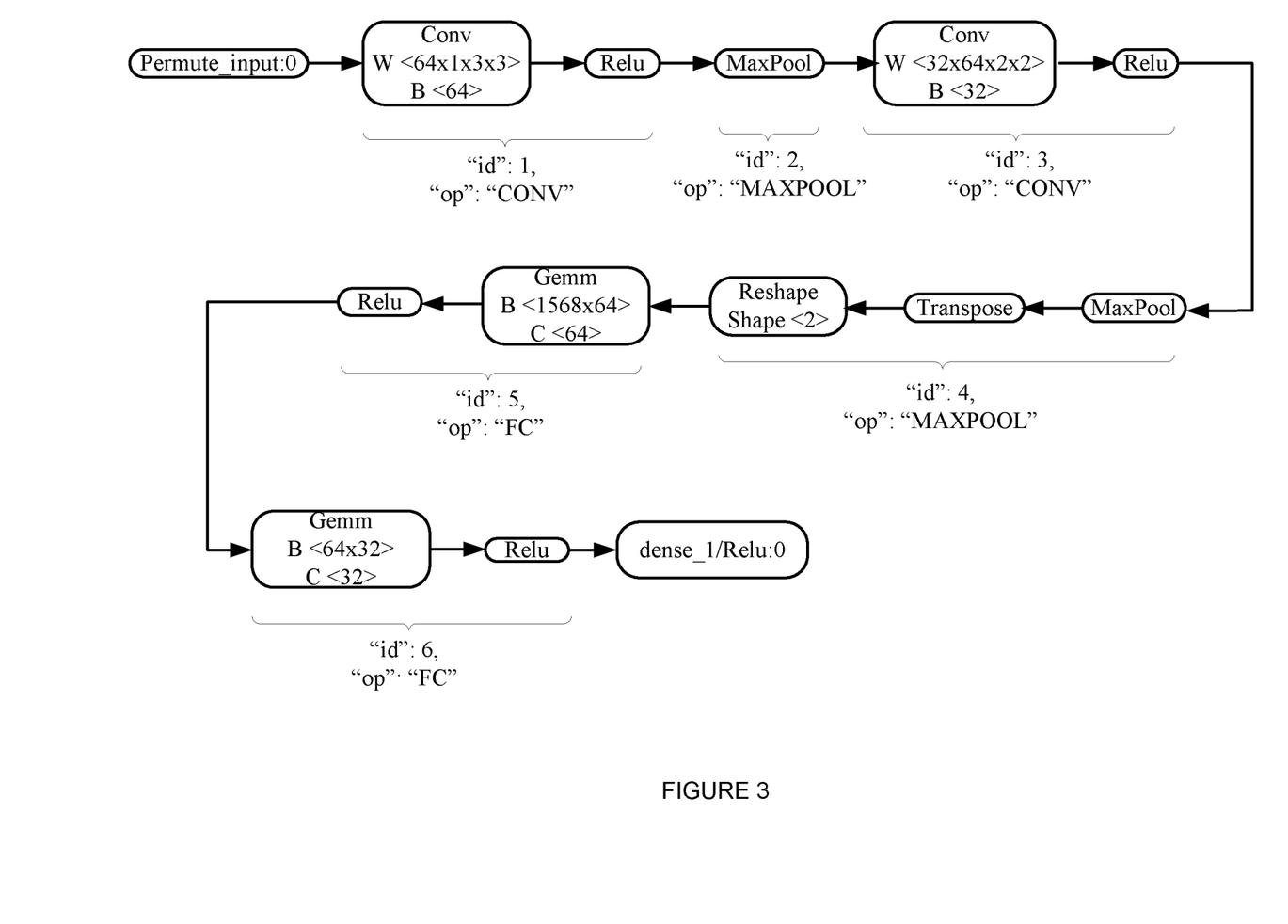
FIG. 3 depicts a network example according to one aspect of the present embodiments.

It is appreciated that in some embodiments, the compiler 220 may receive a network from the host 210, as shown in FIG. 3. It is appreciated that the network of FIG. 3 is for illustrative purposes and should not be construed as limiting the scope of the embodiments. The network may include six layers. The first layer may include a convolutional operation followed by a rectified linear unit (relu) operation. The second layer may include a maxpool operation. The third layer may include a convolutional operation followed by a relu operation. The fourth layer may include a maxpool operation. The fifth layer may include a general matrix multiply (GeMM) operation followed by a relu operation. Finally, the sixth layer may include a GeMM operation followed by a relu operation. In one nonlimiting example, the input to the convolution of the first layer may be 8×1×32×32. The convolution of the first layer may have weight of 64×1×3×3 with a kernel size of 3×3, and bias of 64. As such, the output of the convolution of the first layer may be 8×64×30×30, which is input to the relu block of the first layer. The input to the maxpool of the second layer is 8×64×30×30 and the output may be 8×64×15×15. The input to the convolution of the third layer is therefore 8×64×15×15. The convolution of the third layer may have weight of 32×64×2×2 and a kernel of 2×2 size with bias of 32. The output of the convolution of the third layer is 8×32×14×14 which is input of its relu. The output of the relu from the third layer is 8×32×14×14 which is input to the maxpool of the fourth layer. The output of the maxpool of the fourth layer 8×32×7×7. In one nonlimiting example, the fourth layer may further include a transpose and reshape function where the output of the reshape is 8×1568 in size. The output of the reshape is input to the GeMM of the fifth layer. The GeMM of the fifth layer may have a bias of 1568×64 in size and coefficients of 64. The output of GeMM may be 8×64 which is input to the relu of the fifth layer. The output of the relu in fifth layer is 8×64 which is input to a GeMM of the sixth layer with bias size of 64×32 and coefficient of 32 in size. The output of the GeMM in the sixth layer is 8×32 which is input to the relu of the sixth layer having an output of 8×32 in size.

In some embodiments, the set of low-level instructions are in the format of instruction set architecture (ISA) designed for efficient data processing covering, for non-limiting examples, one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. It is appreciated that a series of instructions in the ISA format do not necessarily imply sequential execution. In some embodiments, the ISA provides separate synchronizing instructions to ensure order between instructions where needed. In some embodiments, when being executed on the ML hardware 260, the set of low-level instructions in the ISA format program the ML hardware 260 by one or more of: (i) programming one or more input data streams to the ML hardware 260; (ii) programming one or more operations to be performed on the input data streams; and (iii) programming one or more output data streams from the ML hardware 260.

In some embodiments, the compiler 220 is configured to generate additional information to further correlate the high-level function to one or more layers of a neural network used for machine learning applications. For non-limiting examples, the neural network can be but is not limited to one of a convolution neural network (CNN), a recurrent neural network (RNN), a gradient boosting machine (GBM), and a generative adversarial neural network. For non-limiting examples, the additional information includes but is not limited to which tasks of the high-level function belong to a specific neural network layer as well as which neural network layer the high-level function belongs to.

Figure 4A:
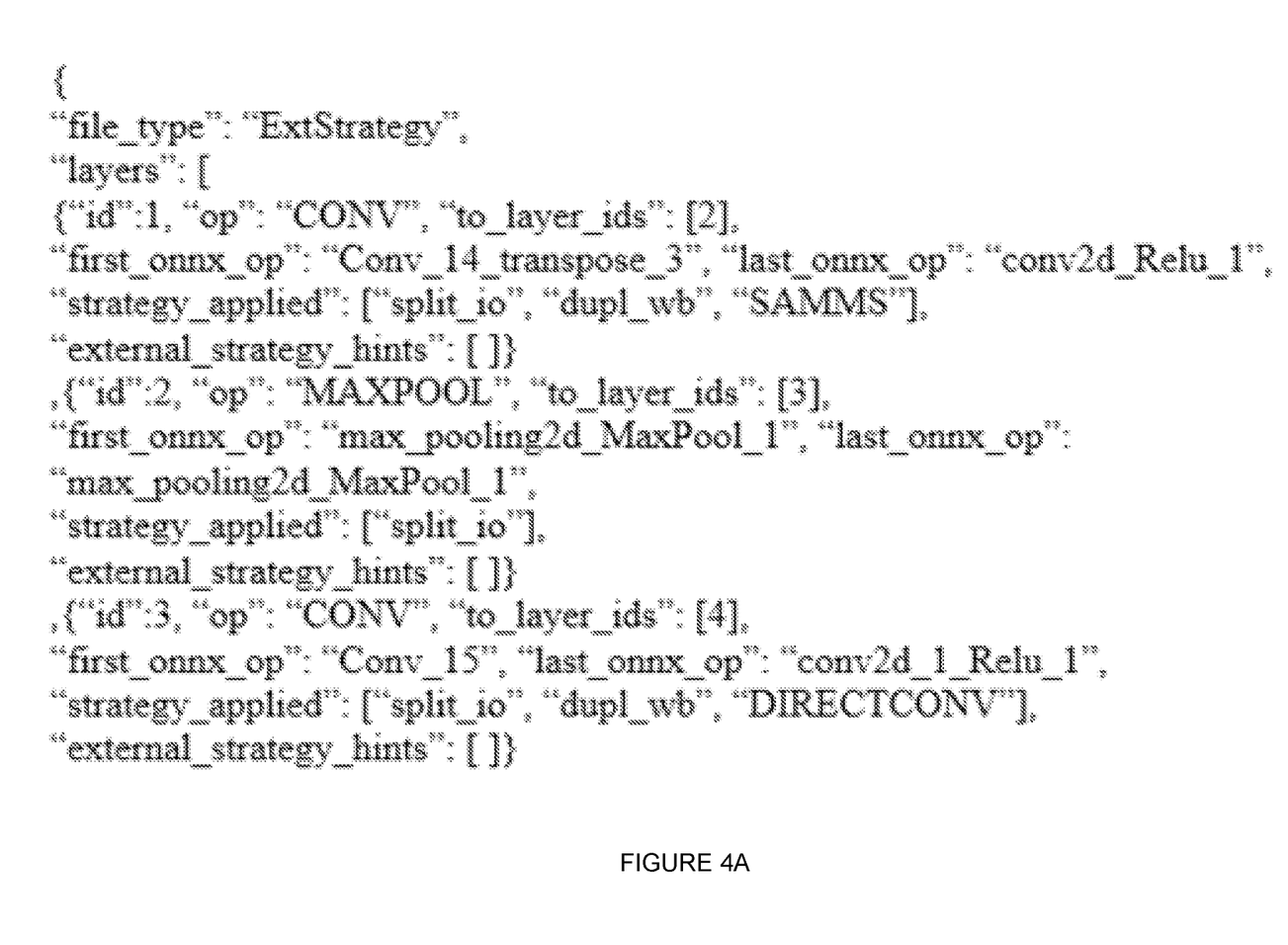
FIGS. 4A-4B depict an example of external strategy file generated by the compiler according to one aspect of the present embodiments.
Figure 4B:
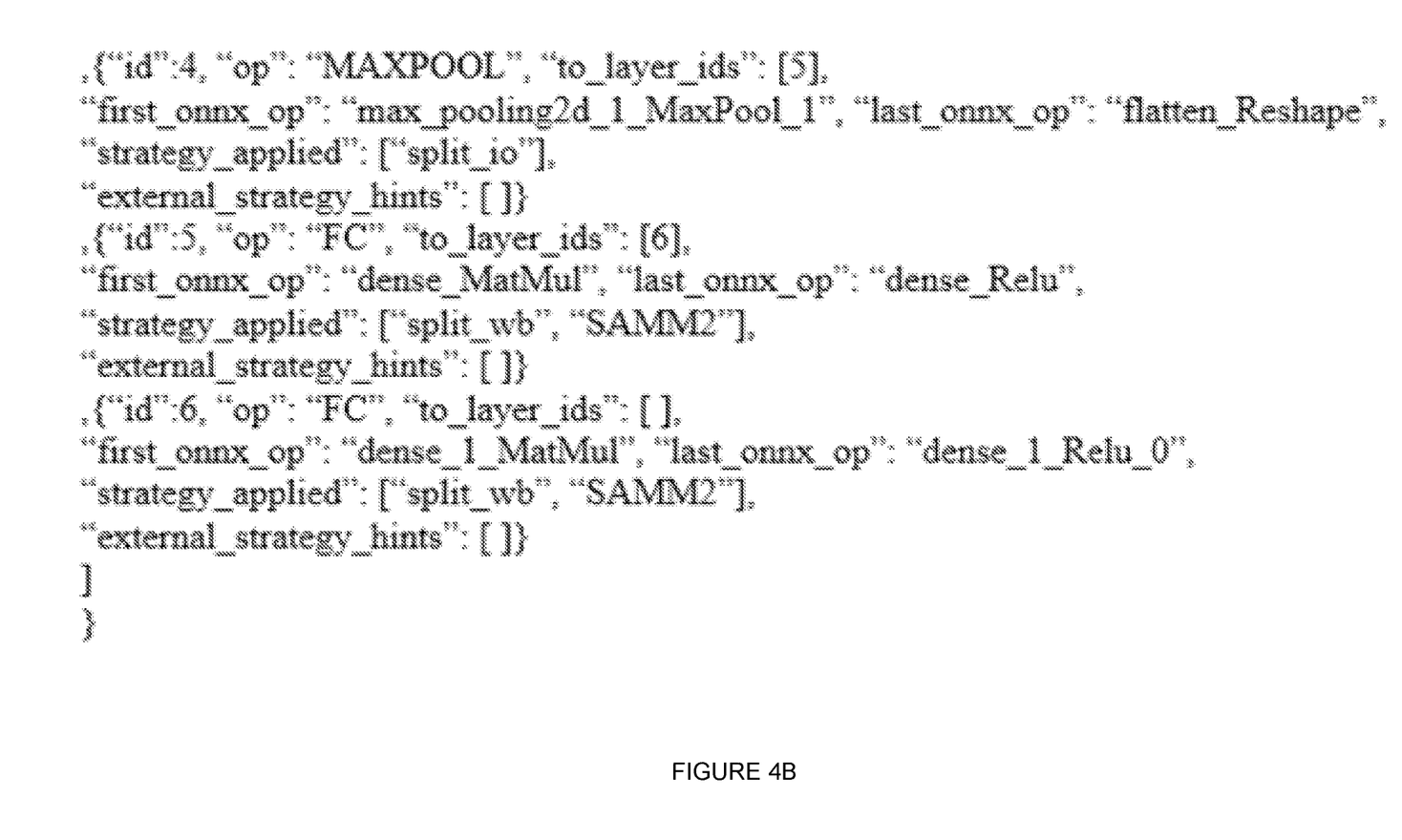

The compiler 220 may generate at least one external strategy 222 to execute a particular task, e.g., convolution, in a particular layer. For example, two strategies may be devised for doing the same operation such as a convolution. In one strategy, the convolution may be performed by splitting input/output (I/O) tensors of an operation into N parts where N may be the maximum number of processing tiles or smaller and distributing the parts across the N processing tiles and/or splitting/duplicating weights/bias, and then performing a Skinny Activation Matrix Multiply Mapping(SAMM) operation. As an example, in another strategy the convolution may be performed directly. The external strategy 222 may be stored in a memory component 230 for later retrieval as a file, e.g., in XML format, in JSON format, in text format, etc. In some embodiments, the external strategy 222 is high-level instructions for the strategy/strategies (e.g., actions/decision) to perform a particular task. For example, FIGS. 4A and 4B show illustrative external strategy that are generated by the compiler 220 for the network of FIG. 3. It is appreciated that in this nonlimiting example, one strategy is generated for each layer for illustration purposes but should not be construed as limiting the scope of the embodiments. For example, two or more strategies may be devised.

Referring specifically to FIG. 4A, external strategies for layers one through three are devised by the compiler 220. The first layer comprises a convolution as its first open neural network exchange (ONNX) operation followed by a relu operation as its last ONNX operation. The compiler 220 in this nonlimiting example has determined a split input/output (as described above), duplication of weight biases and SAMM. The second layer comprises a maxpool operation and the external strategy, as devised by the compiler 220, is split I/O. The third layer includes a convolution operation as a first ONNX operation followed by a relu operation as its last ONNX operation. The external strategy, as devised by the compiler 220, is to split I/O, duplicate weight biases, and to perform a direct convolution (which may be a proprietary direct convolution operation). It is appreciated that the output of the first layer is fed into the second layer and to the third layer.

Referring specifically to FIG. 4B, external strategies for layers four through six, as devised by the compiler 220 are shown. The fourth layer comprises a first ONNX operation of maxpool followed by the last ONNX operation of flattening and reshaping. The external strategy for the fourth layer is to split I/O. The output of the fourth layer is fed into the fifth layer. The fifth layer includes a first ONNX operation of dense matrix multiplication and a last ONNX operation of dense relu operation. The external strategy of the fifth layer is to split weight bias and SAMM operation. The output of the fifth layer is input to the sixth layer with a first ONNX operation as dense matrix multiplication followed by last ONNX operation of dense relu with an external strategy of splitting weigh bias and SAMM operation.

In this nonlimiting example, the compiler 220 has generate one external strategy for each layer, as shown in FIGS. 4A and 4B. It is appreciated that the external strategy 222 may be saved as a file, e.g., as XML, JSON, text, etc., in the memory component 230. The external strategy 222 may also be rendered in a command line. The external strategy 222 may be output to a user using a rending component 240, e.g., a display. The external strategy 222, as illustrated, includes high-level codes that may be user viewable and user modifiable. In other words, the user may choose to change the strategy by modifying the generated file or changing the command in the command line. For example, a user may decide to change the external strategy and modify the generated file containing the external strategy 222. In some embodiments, the user may mark the "external strategy hints" to indicate that the external strategy for a particular layer, e.g., layer 1 as an example, has been changed. For illustrative example, the user may change the external strategy of the first layer convolution to perform a direct convolution rather than SAMM similar to the third layer. In some embodiments, the high-level external strategy may be in the same high-level code format as the received model or in some nonlimiting examples they may be in a different format.

It is appreciated that the compiler 220 may generate low-level executable instructions (in binary) based on the external strategy (either before modification made by user or after). In some embodiments, if low-level executable instructions are generated prior to the modification and if modification to the external strategy is made then updated low-level executable instructions are generated. In some embodiments, the low-level executable instructions are not generated until the user indicates that no modification is needed or after the modification is needed. In one nonlimiting example, the generated low-level executable instructions are sent to the ML hardware 260 for execution.

It is appreciated that if modification to the external strategy is made, then the compiler 220 goes through the compilation process. If the modification is not allowed or causes an error, then the compiler 220 may output an error message to notify the user that the modification to the external strategy is not allowed. In some embodiments, the reasons for disallowing the modification to the external strategies may be rendered to the user. However, if the modification causes no errors, then the modification may be allowed to go through.

In some embodiments, the process may be automated such that multiple external strategies (in some embodiments permutation of all possible external strategies or a subset thereof) are developed by the compiler 220. In some embodiments, the low-level instructions (in binary) may be generated for each external strategy and implemented by the accelerator such that performance and efficiencies associated with each one can be measured. One or more of the generated external strategies may be selected by the compiler 220 or by the user. In some embodiments, the selection of the external strategy is made based on the measured performance/efficiencies or merely based on the external strategy itself without measuring their performance/efficiencies by executing the low-level instructions by the accelerator.

Once the set of low-level instructions has been compiled from each high-level function, the compiler 220 is configured to stream the set of low-level instructions as well as data received from the host for the application to the ML hardware 260 for execution. In the example of FIG. 2, the ML hardware 260 is a dedicated hardware block/component including one or more microprocessors and/or on-chip memory (OCM) units storing the data and/or the set of low-level instructions compiled from the high-level code performing one or more ML operations. For a non-limiting example, the ML hardware 260 can be but is not limited to an inference engine, which is configured to infer and identify a subject for the application via inference from trained data. At runtime, the ML hardware 260 is configured to retrieve the set of low-level instructions and/or data received from the compiler 220 and execute the set of low-level instructions to perform the high-level application/ML operation according to the set of low-level instructions. FIG. 1 depicts a non-limiting example of an inference engine 260 that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler 220. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1.

In order to generate the low-level instructions from high-level functions/code, the compiler 220 having knowledge of the ML hardware 260 architecture and software/system requirements makes certain decisions and performs certain operations in order to generate low-level instructions that are as efficient and as optimized as possible (e.g., from hardware perspective and/or software perspective). For example, the compiler 220 may take certain actions and make certain decisions to reduce data movement, to reduce data conversions, to reduce storage usage, to reduce computation (or duplication of computation), to reduce communication (by duplicating compute if beneficial), etc. A nonlimiting and non-exhaustive list of decisions (e.g., external strategies) being made by the compiler 220 in addition to the above includes but is not limited to:
- identifying and associating certain sub-graphs of a layer to be processed by ML hardware 260 but other sub-graphs to other processing components (e.g., a central processing unit),
- fusing operators into composite to map to hardware ISA task (i.e., maps optimally to hardware architecture capabilities),
- splitting input/output tensors of an operation into N parts where N may be the maximum number of tiles or smaller and distributing the parts across the N tiles. The parts may be of unequal sizes and the split input/output may duplicate the associated weights and bias tensors across all N tiles,
- splitting weights/bias (similar to splitting input/output but applied to weights/bias),
- SAMM/Large Activation Matrix Multiply Mapping (LAMM) (different mappings of two matrices onto the POD registers based on the shape of the matrices and where SAMM indicates one dimension of the input being short whereas LAMM indicates one dimension of the input being long),
- direct convolution (i.e., performing a convolution by directly applying the kernel to the input tensor in contrast to converting a convolution into a matrix-matrix-multiply that is executed after the input tensor is transformed by the flattening stage which results in an increased data movement and data duplication), serializing in time (i.e., mapping an operation into a sequence of steps that are executed sequentially in time), number of tiles to use for certain processing/tasks, dividing tensors and duplicating on tiles (i.e., manner by which to map data to local tiles either distribute or copy or both, where a set of tiles may be grouped together and within the group the data may be split after the original data is duplicated or copied to each group), number of halo cells (i.e. also referred to as ghost cells or rows that are added to distribute data on a tile which contains copies of rows or cells belonging to its neighboring tiles) that allows calculations on a tile be done locally without requiring data to be obtained from neighboring tiles even though it may need the halo cells/rows to be filled via communication prior to executing the calculations, data movement, rebalancing processing on different tiles, memory hierarchy mapping, determining tensor life-cycle (i.e., the amount of time that the tensor data is required to be in memory (mapped to local OCM) to ensure that the last task/instruction that needs to have access to the tensor data has access to the tensor data) in order to perform memory management and to free up unused memory, quantization scaling values (i.e., the output of a certain layer in a quantized network may be rescaled to stay within a particular data range), quantization data types (e.g., signed versus unsigned such as int8 and uint8), rescaling, determining which primitive to use for a given operator (e.g., direct convolution as opposed to flattening plus compute pipeline, complete fully connected (FC) layer (i.e. a matrix-matrix-multiply that might be performed as one distributed matrix-matrix-multiply (performed as single computation block followed by a single communication block) as opposed to being broken up into a pipeline sequence distributed matrix-matrix-multiplies which allows overlapping of communication and computation), input to pipeline decisions (i.e., decision whether to apply a pipeline strategy, e.g., based on matrix sizes the optimal strategy may not be pipelined), overlapping different hardware components, e.g., processing elements, direct memory access (DMA), etc., on ML hardware 260 to increase parallelism, optimizing use of synchronization primitives exposing and utilizing the ML hardware 260 capabilities for diverse set of workloads, e.g., ML workloads, memory layout and conversion (e.g., in channel/height/width or height/width/channel format, etc.).

In some embodiments, as described above, the compiler 220 in addition to generating low-level instructions is also configured to generate external strategies 222 that can be used by the user to determine whether modification to the strategy may be desired.

It is appreciated that the embodiments, as described, provided the user with options to specify the strategy for each layer rather than a list of specific compilation options as it is done conventionally. It is appreciated that providing the external strategy to enable the user to modify the strategy is in addition to other sets of compile options. In some embodiments, the strategy may specify the level of parallelism used for a specific layer and/or specific high-level primitive (i.e., codified algorithm) from a possible set of applicable primitives. As illustrated, the compiler 220 generates a template strategy (i.e., external strategy 222 as described above) during the initial compilation of a model, as an example. The external strategy details the strategy for each layer and decisions taken by the compiler 220 during the initial compilation. The user may then modify the strategy, as desired. It is appreciated that the modification to the external strategy may be used in subsequent compilation step to guide the decisions that need to be made by the compiler 220. In some embodiments, low-level executable may have been generated based on the initial external strategy and executed by the ML hardware 260 while the external strategy is being modified by a user. As such, performance analysis of the initial external strategy may guide the user in making the necessary modification to the external strategy. According to some embodiments, the described process may occur iteratively and as many times as desired and may be manual or automatic.

As such, the compiler 220 provides the user a description of the compiler determined external strategy to enable the user or an automated process to modify the external strategy for successive compilations. As such, the iterative process may be used to select the best strategy to be applied to a model. Moreover, the described embodiments, allow the user to generate optimized code even for newly developed models which the compiler 220 has not been exposed to previously. Accordingly, the compiler developers and the users are enabled to use the embodiments, as described above, to generate optimal code in a faster time. It is appreciated that the external strategy may further provide a record of decisions (e.g., external strategy) that results in particular low-level executable instructions (binary), thereby providing additional insight into the compile process.

Figure 5A:
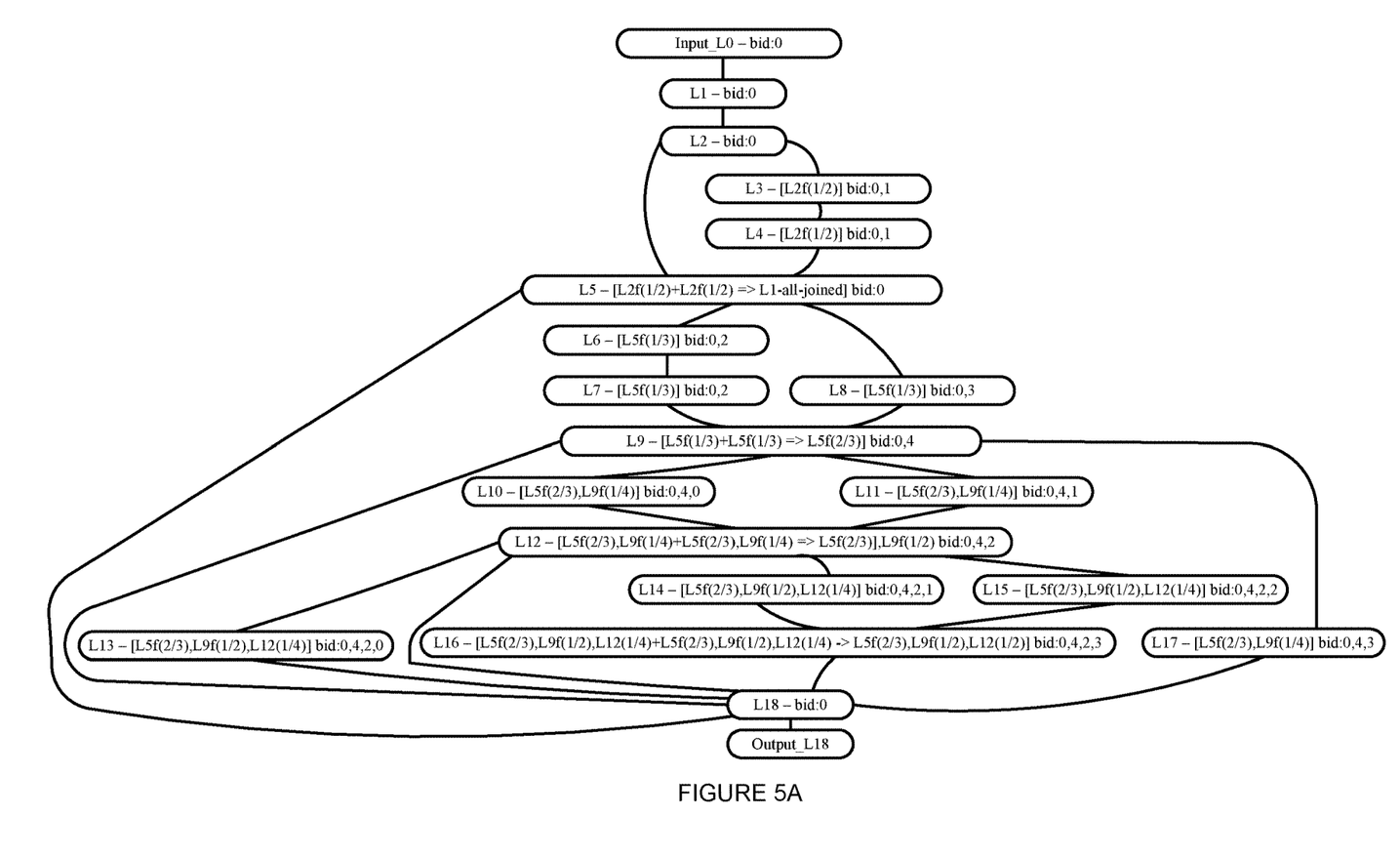
FIGS. 5A-5B depict devising different external strategies to split tensors according to one aspect of the present embodiments.
Figure 5B:
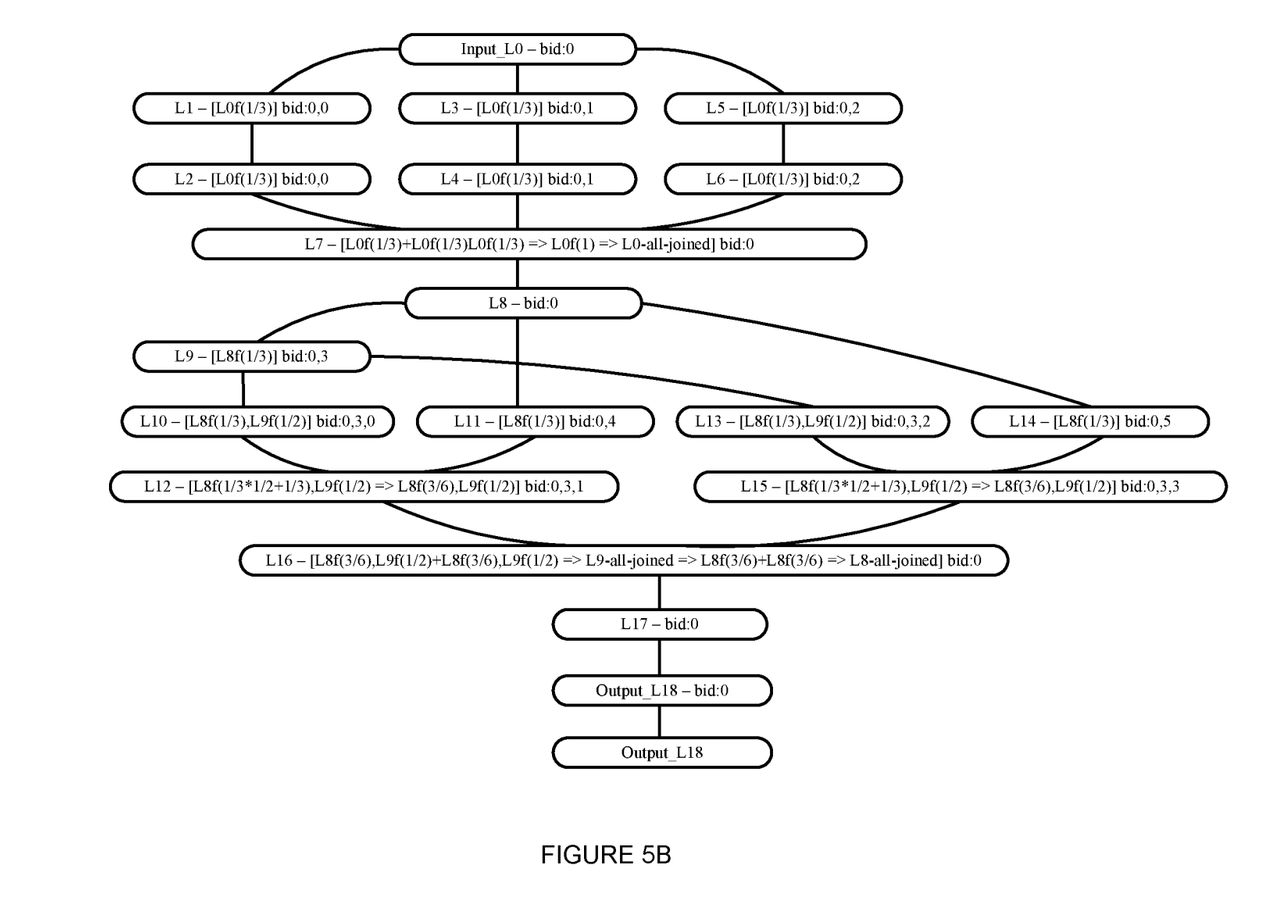

Referring now to FIGS. 5A-5B, devising different external strategies to split tensors according to one aspect of the present embodiments are shown. It is appreciated that the compiler 220 may determine legal graph branches of an ML model and allow tensor splitting to be performed based on legal external strategies. It is appreciated that the example of FIGS. 5A and 5B and the external strategies associated therewith may be presented to the user via a file or a command line operation. In the examples of FIGS. 5A and 5B, the compiler 220 identifies legal branch segments, e.g., in bid map, and then applies different external strategies to split the tensor. Subsequently, the code, e.g., assembly code (ASM), may be generated.

It is appreciated that in one nonlimiting example, splitting tensor may be done on a same graph branch level. The compiler 220 in some embodiments identifies when a joined graph node is a partial graph node versus a fully joined graph node and subsequently given the external multiple split tensor external strategy it determines whether the identified joined graph node is legal. In some nonlimiting example, the compiler 220 splits the tensor, at every layer in order to generate the code and the low-level executable for the ML hardware 260.

Referring specifically to FIG. 5A, the compiler 220 identifies forking graph node, partially joined graph node, and fully joined graph node. In this nonlimiting example, reduction may occur at joined graph nodes. At level 3 (e.g., L3), one fork branch of L2 is received. At L3, L2f($\frac{1}{2}$) represents saving pending branch joining history and $\frac{1}{2}$ represents one out of 2 forking branches. At L4, the forking history from upstream L3 is copied. Reduction at L5, which is a joining node, includes a direct forking upstream left branch (i.e., L2f(½)) and right upstream branch L4 L2f(½). As such, L2f(½)+L2f(½) results in L2f(1) and as such at L2 all fork-join history can be removed. Partial L5 branch joining at L9 due to two out of three L5 forking branches have joined. L7 includes L5f(⅓) and L8 includes L5f(⅓) result in L9 that includes L5f(⅔) (it is appreciated that utilizing floating value of ⅔ indicates fractional number of all forking branches that have been joined. It is appreciated that L10 includes both L5 forking pending and new L9 forking of one out of four. Partial L9 branch joins L12 and partial L12 branch joins at L16. Finally, at L18, L12 branch joins and reduces, L9 branch joins and reduces, and L5 branch joins and reduces. For L12 branch joining and reducing:

1. direct left-most branch from L12: L12f(¼)
2. coming from L13: L5f(⅔),L9f(½),L12(¼)
3. corning from L16: L5f(⅔),L9f(½),L12(½)
4. →L5f(⅔),L9f(½),L12(¼+¼+½)→L5f(⅔),L9f(½), L12(1)→L12-all-joined so can reduce
5. →L5f(⅔),L9(½)

For L9 Branch Joining and Reduction:
1. Direct left-most branch from L9: L5f(⅔),L9f(¼)
2. Coming from above L12 reduction: L5f(⅔),L9f(½)
3. Coming from L17: L5f(⅔),L9g(¼)
4. →L5(⅔),L9f(¼+½+¼)→L5(⅔),L9f(1)→L-all-joined so can reduce
5. →L5f(⅔)

and for L5 branch joining and reduction:
1. Direct left-most branch from L5: L5f(⅓)
2. Coming from above L9 reduction: L5f(⅔)
3. →L5(⅓+⅔)→L5f(1)→L5-all-joined so can reduce
4. →no pending item It is appreciated that for legal branch segment the layer IDS on the same row are included to apply the tensor splitting, as shown below:

Debug: Bid: 0 -L1 L2 L5 L18
Debug: Bid: 0.1 -L3 L4
Debug: Bid: 0.2 -L6 L7
Debug: Bid: 0.3 -L8
Debug: Bid: 0.4 -L9
Debug: Bid: 0.4.0 -L10
Debug: Bid: 0.4.1 -L11
Debug: Bid: 0.4.2 -L12
Debug: Bid: 0.4.2.0 -L13
Debug: Bid: 0.4.2.1 -L14
Debug: Bid: 0.4.2.2 -L15
Debug: Bid: 0.4.2.3 -L16
Debug: Bid: 0.4.3 -L17

It is appreciated that one legal example of the external strategy for FIG. 5A and is further based on the tensor size of different layers and further based on the structure of the ML hardware 260. The external strategy for FIG. 5A may be:
-stages=L1L5H2W8,L6L7H1W8,L8L8H1W8,
L10L10H1W4,L11L11H1W8,L14L14H1W8,
L15L15H1W5,L13L13H1W8,L17L17H1W8

Figure 6:
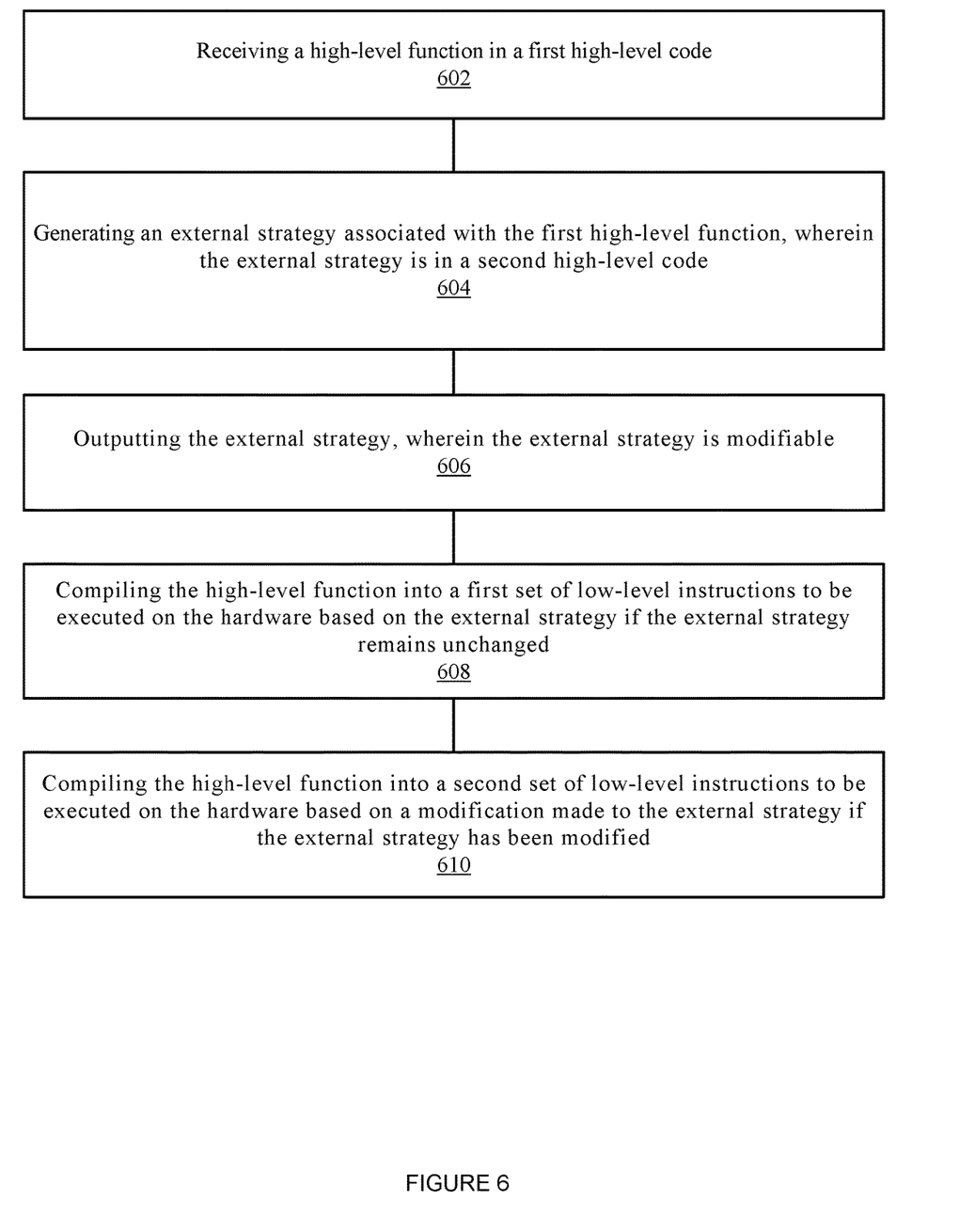
FIG. 6 depicts a flowchart of an example of a process for generating an external strategy output according to one aspect of the present embodiments.

Referring now to FIG. 5B, the same scenario is depicted with other types of partial joining and reduction cases. Similar to FIG. 5A, at L1, L3, and L5, each is forking from L0 and as such each have L0f(⅓). Similar to FIG. 5A, at L2, L4, and L6, each copy the fork join history from its upstream node. Similar to FIG. 5A, L7 has no pending items because all L0 forking branches have joined. At each L8, L9, L10, L11, L13, and L14, each perform a set of actions as described among nodes described in FIG. 5A. In FIG. 5B, new action of combining fork join history occurs at L12, as shown below:

i. Upstream L10 has partial joining as L8f(⅓),L9f(½)
ii. Upstream L11 also has partial joining as L8f(⅓)
iii. We need to keep both partial joining values and in the same time, combining L8's joining value as
   1. From L10: L8f(⅓),L9(½)→L8f(⅓*½), L9f(½)→L8f(⅙),L8f(½)<<<in order to combine L8, we need to calculate its "real" joining value from L10
   2. Now, we can combined L10 and L11 as: L8f(⅙+⅓),L9f(½)→L8f(³⁄₆),L9f(½) without losing any pending information At L15, combining fork join history, similar to FIG. 5A is performed. At L16, reduction occurs twice, as shown below:
i. Upstream L14 has L8f(³⁄₆),L9f(½)
ii. Upstream L15 has L8f(³⁄₆),L9f(½)
iii. →L9-all-joined and can be reduced→that gives us L8f(³⁄₆)+L8f(³⁄₆)→L5-all-joined and can be reduced FIG. 6 depicts a flowchart of an example of a process for generating an external strategy output according to one aspect of the present embodiments. At step 602, a high-level function in a first high-level code is received, as described above. At step 604, an external strategy associated with the first high-level function is generated, as described above. The external strategy is in a second high-level code (which may be the same or different than the first high-level code). At step 606, the external strategy is output. It is appreciated that the external strategy may be either machine or user modifiable. Moreover, the external strategy may be user viewable. At step 608, the high-level function is compiled into a first set of low-level instructions to be executed on the hardware based on the external strategy if the external strategy remains unchanged. At step 610, the high-level function is compiled into a second set of low-level instructions to be executed on the hardware based on a modification made to the external strategy if the external strategy has been modified.

It is appreciated that the external strategy may be save as a file, e.g., as a JSON or XML file. In some embodiments, the first set of low-level instructions may be transmitted to the hardware for execution if the external strategy is unchanged and the second set of low-level instructions may be transmitted to the hardware for execution if the external strategy has been modified. It is appreciated that the high-level function may be associated with a ML model and that the external strategy may include at least one strategy for each layer of the ML model. It is appreciated that the external strategy may be at least one approach to solve the high-level function.

It is appreciated that in some embodiments, the step 602-606 may be performed. However, it is appreciated that in some embodiments, the compiler may compile the first set of low-level instructions to be executed by the hardware based on the external strategy regardless of whether the external strategy is modified. The first set of low-level instructions may then be transmitted to the hardware and executed. Performance related data associated with the execution of the first set of low-level instructions may be transmitted to the compiler. The external strategy and/or the performance related data may be output, e.g., to the user. As such, the external strategy may be modified at least partly based on the performance related data. If the external strategy is modified, then the modified external strategy may be compiled into a second set of low-level instructions. The second set of low-level instructions may be transmitted to the hardware for execution. It is appreciated that if modification to the external strategy is made, then the compiler 220 may go through the compilation process and if the modification is not allowed or causes an error, then the compiler may output an error message. As such, the user is notified that the modification to the external strategy causes an error and is therefore not allowed.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A compiler implemented method, comprising:
   receiving a first high-level function in a first high-level code;
   receiving a second high-level function in the first high-level code;
   generating a first external strategy associated with the first high-level function, wherein the first external strategy is in a second high-level code;
   generating a second external strategy associated with the second high-level function, wherein the second external strategy is in the second high-level code,
      wherein the first external strategy and the second external strategy each include at least one or more decisions by the compiler associated with 1) transformation associated with tensors, or 2) changing precision, or 3) dimension reordering, or 4) splitting or copying of tensors, weights, or bias, across a plurality of processing elements, or 5) compile time optimization, or 6) identifying and associating sub-graphs of layer for processing, or 7) fusing operators into composite, or 8) Skinny Activation Matrix Multiply Mapping (SAMM) Large Activation Matrix Multiply Mapping (LAMM), or 9) direct convolution, or 10) serialization in time, or 11) number of processing elements to utilize, or 12) number of halo cells, or 13) data movement, or 14) rebalancing processing on different processing elements, or 15) memory hierarchy mapping, or 16) tensor life-cycle, or 17) quantization values, or 18) quantization data type, or 19) rescaling, or 20) determining primitive, or 21) input to pipeline decisions, or 22) overlapping different hardware components, or 23) optimization use of synchronization primitives, or 24) exposing and utilizing hardware capabilities, or 25) memory layout and conversion;
   outputting a file that includes the first external strategy and the second external strategy in the second high-level code, wherein the first external strategy and the second external strategy are modifiable;
   determining that the first external strategy remains unchanged;
   compiling the first high-level function into a first set of low-level instructions to be executed on a hardware based on the first external strategy;
   determining that the second external strategy has been modified in the file; and
   compiling the second high-level function into a second set of low-level instructions to be executed on the hardware based on the modification made to the second external strategy.

2. The compiler implemented method of claim 1 further comprising storing the first external strategy as a file, wherein the file is in a markup format or in an Object Notation format or in a text format.

3. The compiler implemented method of claim 2, wherein the Object Notation is a JavaScript Object Notation (JSON) file and wherein the markup format is an extensible markup language (XML) format.

4. The compiler implemented method of claim 1 further comprising transmitting the first and the second set of low-level instructions to the hardware for execution.

5. The compiler implemented method of claim 1, wherein the second external strategy is rendered to a user and wherein the second external strategy is modified by the user.

6. The compiler implemented method of claim 1, wherein the first high-level function in the first high-level code is associated with a machine learning (ML) model.

7. The compiler implemented method of claim 6, wherein the first external strategy includes at least one strategy for each layer associated with the ML model.

8. The compiler implemented method of claim 1, wherein the first external strategy is one approach to solve the first high-level function.

9. The compiler implemented method of claim 1, wherein the first high-level code is in a different format than that of the second high-level code.

10. A compiler implemented method, comprising:
    receiving a high-level function in a first high-level code;
    generating an external strategy based on the high-level function, wherein the external strategy is in a second high-level code,
       wherein the external strategy includes at least one or more decisions by the compiler associated with 1) transformation associated with tensors, or 2) changing precision, or 3) dimension reordering, or 4) splitting or copying of tensors, weights, or bias, across a plurality of processing elements, or 5) compile time optimization, or 6) identifying and associating sub-graphs of layer for processing, or 7) fusing operators into composite, or 8) Skinny Activation Matrix Multiply Mapping (SAMM) Large Activation Matrix Multiply Mapping (LAMM), or 9) direct convolution, or 10) serialization in time, or 11) number of processing elements to utilize, or 12) number of halo cells, or 13) data movement, or 14) rebalancing processing on different processing elements, or 15) memory hierarchy mapping, or 16) tensor life-cycle, or 17) quantization values, or 18) quantization data type, or 19) rescaling, or 20) determining primitive, or 21) input to pipeline decisions, or 22) overlapping different hardware components, or 23) optimization use of synchronization primitives, or 24) exposing and utilizing hardware capabilities, or 25) memory layout and conversion;
    compiling the high-level function into a first set of low-level instructions to be executed on a hardware based on the external strategy;
    transmitting the first set of low-level instructions to the hardware for execution;
    receiving performance related data from the hardware based on execution of the first set of low-level instructions by the hardware;

outputting the external strategy in the second high-level code and the performance related data, wherein the external strategy is modifiable; and in response to receiving a modification to a file from a user, wherein the modification is to the external strategy within the file, compiling the high-level function into a second set of low-level instructions to be executed on the hardware.

11. The compiler implemented method of claim 10 further comprising storing the external strategy as a file, wherein the file is in a markup format or in an Object Notation format or in a text format.

12. The compiler implemented method of claim 11, wherein the Object Notation format is a JavaScript Object Notation (JSON) file and wherein the markup format is an extensible markup language (XML) format.

13. The compiler implemented method of claim 10 further comprising transmitting the second set of low-level instructions to the hardware for execution if the external strategy has been modified.

14. The compiler implemented method of claim 10, wherein the external strategy is rendered to a user and modified by the user.

15. The compiler implemented method of claim 10, wherein the high-level function in the first high-level code is associated with a machine learning (ML) model.

16. The compiler implemented method of claim 15, wherein the external strategy includes at least one strategy for each layer associated with the ML model.

17. The compiler implemented method of claim 10, wherein the external strategy is one approach to solve the high-level function.

18. The compiler implemented method of claim 10, wherein the first high-level code is in a different format than that of the second high-level code.

19. The compiler implemented method of claim 10, wherein the modification to the external strategy is at least based on the performance related data.

20. A system, comprising:
a compiler executed by a processor, wherein the compiler is configured to
receive a first high-level function in a first high-level code;
receive a second high-level function in the first high-level code;
generate a first external strategy associated with the first high-level function, wherein the first external strategy is in a second high-level code;
generate a second external strategy associated with the second high-level function, wherein the second external strategy is in the second high-level code,
wherein the first external strategy and the second external strategy each include at least one or more decisions by the compiler associated with 1) transformation associated with tensors, or 2) changing precision, or 3) dimension reordering, or 4) splitting or copying of tensors, weights, or bias, across a plurality of processing elements, or 5) compile time optimization, or 6) identifying and associating sub-graphs of layer for processing, or 7) fusing operators into composite, or 8) Skinny Activation Matrix Multiply Mapping (SAMM) Large Activation Matrix Multiply Mapping (LAMM), or 9) direct convolution, or 10) serialization in time, or 11) number of processing elements to utilize, or 12) number of halo cells, or 13) data movement, or 14) rebalancing processing on different processing elements, or 15) memory hierarchy mapping, or 16) tensor life-cycle, or 17) quantization values, or 18) quantization data type, or 19) rescaling, or 20) determining primitive, or 21) input to pipeline decisions, or 22) overlapping different hardware components, or 23) optimization use of synchronization primitives, or 24) exposing and utilizing hardware capabilities, or 25) memory layout and conversion;

output a file that includes the second external strategy, wherein the first external strategy and the second external strategy are modifiable;

determine that the first external strategy remains unchanged;

compile the first high-level function into a first set of low-level instructions to be executed on a hardware based on the first external strategy;

determine that the second external strategy has been modified in the file; and compile the second high-level function into a second set of low-level instructions to be executed on the hardware based on a modification made to the second external strategy.

21. The system of claim 20 further comprising a memory component configured to store the second external strategy as a file, wherein the file is in a markup format or in an Object Notation format or in a text format.

22. The system of claim 21, wherein the Object Notation format is a JavaScript Object Notation (JSON) file and wherein the markup format is an extensible markup language (XML) format.

23. The system of claim 20, wherein the compiler is further configured to transmit the first and the second set of low-level instructions to the hardware for execution.

24. The system of claim 20, wherein the second external strategy is rendered to a user and modified by the user.

25. The system of claim 20, wherein the first high-level function in the first high-level code is associated with a machine learning (ML) model.

26. The system of claim 25, wherein the second external strategy includes at least one strategy for each layer associated with the ML model.

27. The system of claim 20, wherein the second external strategy is one approach to solve the first high-level function.

28. The system of claim 20, wherein the first high-level code is in a different format than that of the second high-level code.

29. A system, comprising:
a means for receiving a first high-level function in a first high-level code;
a means for receiving a second high-level function in the first high-level code;
a means for generating a first external strategy associated with the first high-level function, wherein the first external strategy is in a second high-level code;
a means for generating a second external strategy associated with the second high-level function, wherein the second external strategy is in the second high-level code,
wherein the first external strategy and the second external strategy each include at least one or more decisions by a compiler associated with 1) transformation associated with tensors, or 2) changing precision, or 3) dimension reordering, or 4) splitting or copying of tensors, weights, or bias, across a plurality of processing elements, or 5) compile time optimization, or 6) identifying and associating sub-graphs of layer for processing, or 7) fusing operators into composite, or 8) Skinny Activation Matrix Multiply Mapping (SAMM) Large Activation Matrix Multiply Mapping (LAMM), or 9) direct convolution, or 10) serialization in time, or 11) number of processing elements to utilize, or 12) number of halo cells, or 13) data movement, or 14) rebalancing processing on different processing elements, or 15) memory hierarchy mapping, or 16) tensor lifecycle, or 17) quantization values, or 18) quantization data type, or 19) rescaling, or 20) determining primitive, or 21) input to pipeline decisions, or 22) overlapping different hardware components, or 23) optimization use of synchronization primitives, or 24) exposing and utilizing hardware capabilities, or 25) memory layout and conversion;

a means for outputting a file that includes the first external strategy and the second external strategy, wherein the first external strategy and the second external strategy are modifiable;

a means for determining that the first external strategy remains unchanged;

a means for compiling the first high-level function into a first set of low-level instructions to be executed on a hardware based on the first external strategy;

a means for determining that the second external strategy has been modified in the file; and a means for compiling the second high-level function into a second set of low-level instructions to be executed on the hardware based on a modification made to the second external strategy.

* * * * *